United States Patent
Koffron

(10) Patent No.: US 7,454,408 B2
(45) Date of Patent: Nov. 18, 2008

(54) SYSTEM AND METHOD FOR OPTIMIZED DISTRIBUTED FILE TRANSFER

(75) Inventor: Micah A. Koffron, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 287 days.

(21) Appl. No.: 11/150,338

(22) Filed: Jun. 10, 2005

(65) Prior Publication Data

US 2006/0282405 A1    Dec. 14, 2006

(51) Int. Cl.
*G06F 7/00* (2006.01)
(52) U.S. Cl. .......................... 707/2; 709/227; 709/232; 709/229; 707/204; 707/8; 707/201
(58) Field of Classification Search ............ 707/1, 707/2; 709/227, 232
See application file for complete search history.

(56) References Cited

U.S. PATENT DOCUMENTS

| | | | |
|---|---|---|---|
| 6,173,293 B1 * | 1/2001 | Thekkath et al. ............ 707/201 |
| 6,820,085 B2 * | 11/2004 | Nishizawa et al. ............ 707/10 |
| 7,149,797 B1 * | 12/2006 | Weller et al. ................. 709/223 |
| 2002/0163882 A1 * | 11/2002 | Bornstein et al. ............ 370/227 |
| 2003/0115206 A1 * | 6/2003 | Gilbert ........................ 707/100 |
| 2004/0024786 A1 * | 2/2004 | Anderson et al. ............ 707/200 |
| 2005/0021863 A1 * | 1/2005 | Jungck ........................ 709/246 |
| 2005/0071496 A1 * | 3/2005 | Singal et al. ................. 709/232 |
| 2006/0041614 A1 * | 2/2006 | Oe ............................... 709/203 |
| 2006/0075139 A1 * | 4/2006 | Jungck ........................ 709/245 |
| 2006/0112176 A1 * | 5/2006 | Liu et al. ..................... 709/223 |

* cited by examiner

*Primary Examiner*—Greta L Robinson
*Assistant Examiner*—Thu Nga Nguyen
(74) *Attorney, Agent, or Firm*—Merchant & Gould

(57) ABSTRACT

A system and method for optimized distribution of files from a file server to a high number of client machines. The client machines are interconnected as nodes in a binary tree structure with each level of nodes receiving the files from a higher level and transferring to a lower level. The file server is the root node of the tree. A database is arranged to store the tree structure information, register new client machines requesting file transfer, and determine lowest cost paths for new links within the tree structure. The lowest cost paths are determined based on cost parameters assigned to network switches between nodes of the tree. Each client machine acting as a child node is arranged to receive the files from a parent node as the files are stored in the parent node, and disconnect from the parent node upon receiving all of the files.

18 Claims, 7 Drawing Sheets

|     | S1 | S2 | S3 | S4 | S5 | S6 |
|-----|----|----|----|----|----|----|
| S1  | 1  | 7  | 6  | 16 | 21 | 22 |
| S2  | 7  | 1  | 6  | 16 | 21 | 22 |
| S3  | 6  | 6  | 5  | 15 | 20 | 21 |
| S4  | 16 | 16 | 15 | 10 | 15 | 16 |
| S5  | 21 | 21 | 20 | 15 | 5  | 6  |
| S6  | 22 | 22 | 21 | 16 | 6  | 1  |

*Fig. 5*

SYSTEM AND METHOD FOR OPTIMIZED DISTRIBUTED FILE TRANSFER

BACKGROUND OF THE INVENTION

Some networks are arranged to quickly and reliably transfer large amounts of file data to a high number of machines simultaneously. Sometimes the machines to be involved in the transfer are not all known, the exact time when they will request the transfer is not known, and the file data requested may be different from machine to machine but is known that a fair number of machines will request the same (large) set of file data. Such networks may include software test labs, where a high number of test machines need to receive disk images from the main file server.

One method for transferring files in such a network is to have all the machines request the file data from the central file server. In such a centralized distribution structure, performance may drop markedly after a number of machines initiate requests and decline rapidly as more machines make request. At some point, the requests may actually begin to timeout and fail. The file server becomes at some point constrained by disk, CPU, or network bandwidth. Pushing the server past these limits results in poor performance and error conditions. Solutions involving purchasing more file servers have the drawbacks of increased hardware costs, data replication between the servers, load balancing, and additional hardware to maintain.

Another possible solution is to attempt to use broadcast or multicast network operations to distribute the file data. Broadcast may not be appropriate, as there are a number of sets of distinct file data to be distributed to a number of sets of different machines, which is outside the application of broadcast networking. Multicast networking may be a better fit to the problem, but has the limitations of lack of multicast file transfer software and not knowing the set of machines to transfer to at the beginning of the transfer.

SUMMARY OF THE INVENTION

Aspects of the present invention relate to a system and method for optimized distribution of files from a file server to client machines reliably and efficiently in an environment where a relatively high number of client machines may request transfer of similar files. The client machines may be interconnected as nodes in a binary tree structure with each level of nodes receiving the files from a higher level and transferring to a lower level. The file server is the root node of the tree. A database associated with the file server may store the tree structure information, register new client machines requesting file transfer, and determine lowest cost paths for new links within the tree structure. The lowest cost paths may be determined based on cost parameters assigned to network switches between nodes of the tree. A cost parameter may be assigned based on a dedication level of each switch. Each client machine acting as a child node receives the files from a parent node as the files are stored in the parent node, and disconnect from the parent node upon receiving all of the files.

In accordance with one aspect, a computer-implemented method is provided whereby a first computing device is connected to the file source location for copying the files from the file source location, and a second computing device is connected to the first computing device for copying the files from the first computing device. The connection between the file source location, the first computing device, and the second computing device is organized according to a tree structure such that a number of connections to the file source location is limited.

The method further includes connecting additional computing devices to the first computing device and the second computing device for copying the files from the first computing device and the second computing device such that a number of connections to all computing devices is limited.

According to another aspect, the second computing device, and the additional computing devices are arranged in a binary tree structure comprising parent and child nodes such that each computing device acting as a parent node is connected to a single child node or two child nodes, but not more.

According to a further aspect, a computer-readable medium with computer instructions for optimized distribution of files from a file source location to computing devices in a network is provided. The instructions include determining a number of switches associated with the computing devices to receive the files and assigning a cost parameter to each switch based on at least one characteristic of each switch. The instructions further include connecting the computing devices to receive the files such that the computing devices are arranged in a tree structure with the file source location acting as a root node. A position of each computing device in the tree is determined based on a computation of the cost parameters associated with the computing device.

According to yet another aspect, the computation of the cost parameters associated with the computing device includes adding the cost parameters of each switch between the computing device and the file source location.

BRIEF DESCRIPTION OF THE DRAWINGS

FIG. 5 is an example table illustrating assigned shortest path costs for network switches of the file transfer system of FIG. 4.

DETAILED DESCRIPTION

Embodiments of the present invention now will be described more fully hereinafter with reference to the accompanying drawings, which form a part hereof, and which show, by way of illustration, specific exemplary embodiments for practicing the invention. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Illustrative Operating Environment

Figure 1:
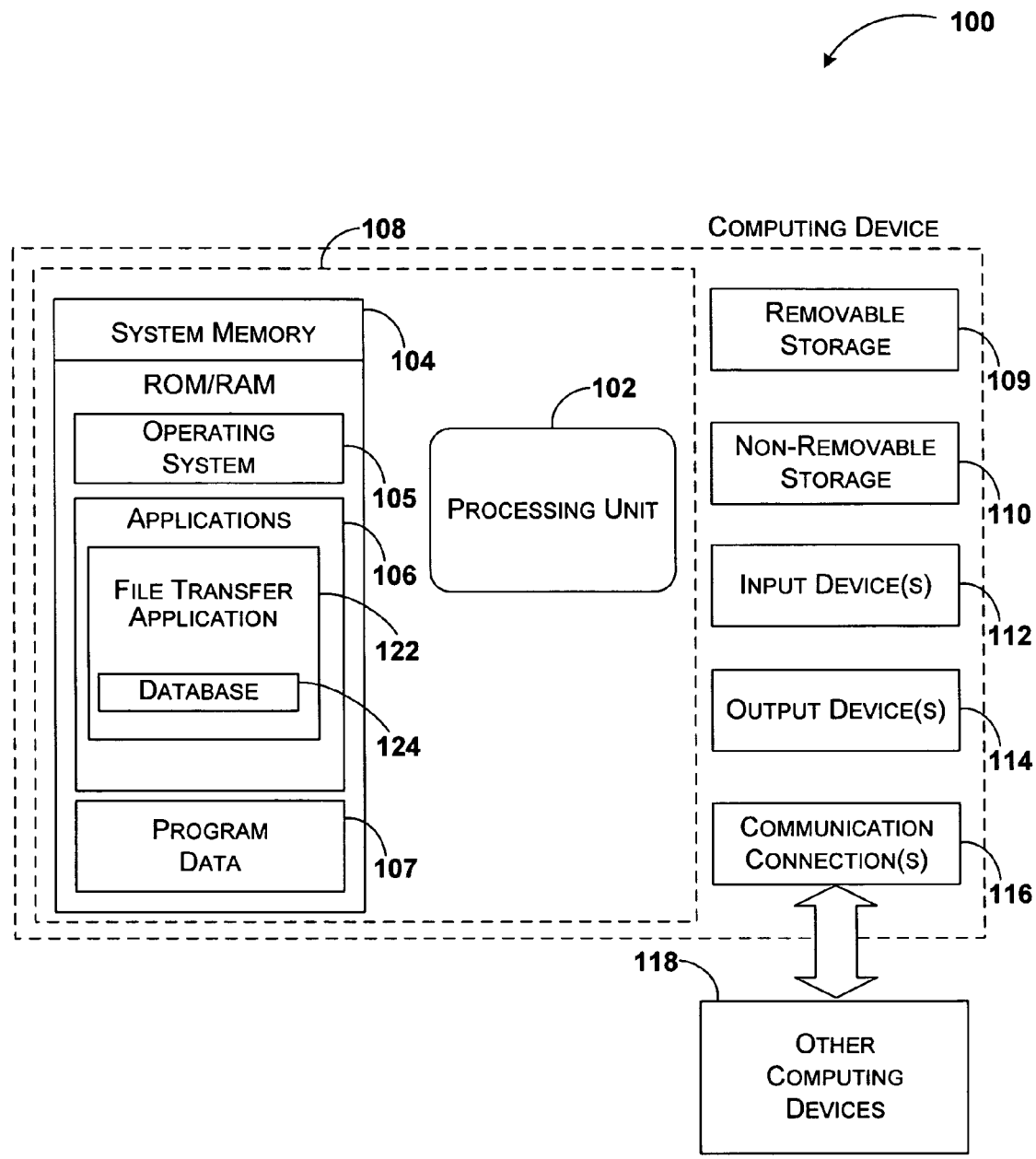
FIG. 1 illustrates a computing device that may be used according to an example embodiment.

Referring to FIG. 1, an example system for implementing the invention includes a computing device, such as computing device 100. In a basic configuration, computing device 100 typically includes at least one processing unit 102 and system memory 104. Depending on the exact configuration and type of computing device, system memory 104 may be volatile (such as RAM), non-volatile (such as ROM, flash memory, and the like) or some combination of the two. System memory 104 typically includes an operating system 105, one or more applications 106, and may include program data 107. This basic configuration is illustrated in FIG. 1 by those components within dashed line 108.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. All these devices are known in the art and need not be discussed at length here.

Computing device 100 also contains communications connection(s) 116 that allow the device to communicate with other computing devices 118, such as over a network or a wireless mesh network. Communications connection(s) 116 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

In one embodiment, applications 106 further include file transfer application 122, which is arranged to transfer files to the client machines requesting image download. In one embodiment, file transfer application 122 may include database 124 for storing files to be transferred, network structure information, client machine information, and the like. In another embodiment, some or all of the data may be stored in a remote database and accessed by file transfer 122. The remote database may even reside in other computing devices. File transfer application 122 may interact with other computing devices through communication connection 116.

Illustrative Embodiments for Providing Optimized Distributed File Transfer

Embodiments of the present invention are related to a system and method for quickly and reliably transferring large amounts of file data to a high number of machines simultaneously, where a number of the machines requesting data download may not be known beforehand.

According to one embodiment, a main file server acts as the root node of a binary tree structure and two client machines are allowed to directly copy from that file server as leaves of that root node. As more client machines are added into the system, they proceed to copy from the two client machines that are copying from the main file server. The file copies between the client machines may all occur simultaneously (not with one level in the tree needing to complete before the next can start) such that the files "trickle" down the tree. Hence, the leaf nodes in the tree experience only a relatively small latency in receiving each file. Once the first two client machines have each of their two leaf nodes filled, any additional client machines may be added for copying from the second level client machines, and so on, allowing for an unlimited number of client machines copying at any time. In this fashion, the workload is divided such that any client machine has at most three connections over which files are being transferred. One connection is to the parent node copying files from it. The other two connections are from child nodes attempting to copy from this client machine.

According to an additional embodiment, network switches are involved in connecting the client machines to each other and the main file server. To optimize the distribution of files, a cost value indicating transmission time, throughput, and the like, is assigned to each path between the switches. A cost matrix provides a copy management application information to determine a path to copy the files with least cost. Connections between the client machines are formed based on the information from the cost matrix.

Figure 2:
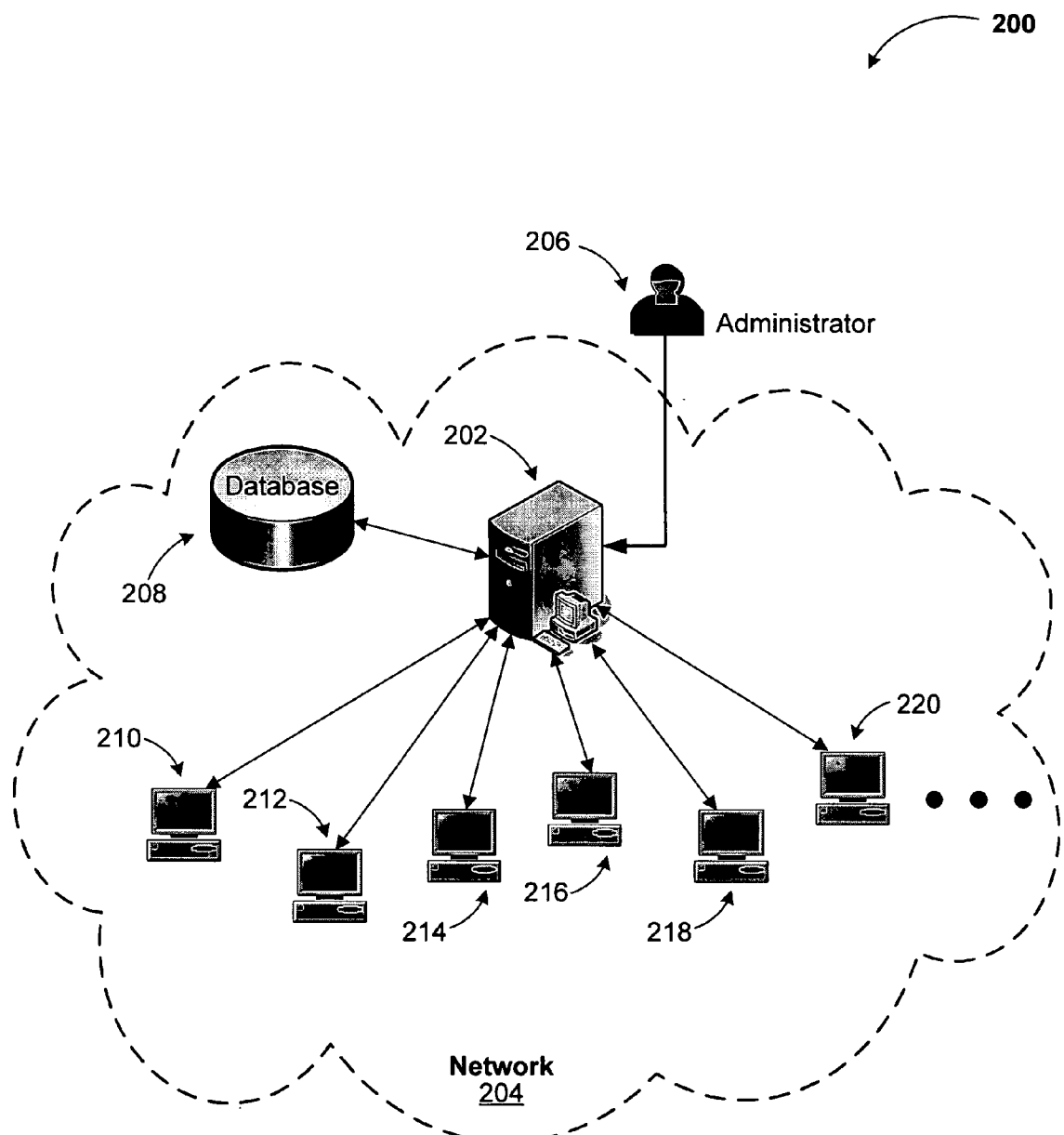
FIG. 2 illustrates an example file transfer system comprising a file server and client machines in a centralized distribution tree structure.

FIG. 2 illustrates example file transfer system 200 comprising a file server and client machines in a centralized distribution tree structure. File transfer system 200 includes network 204, in which file server 202 and a number of client machines (e.g. client machines 210-220) participate. File server 202 may be managed by administrator 206. In one embodiment, network 204 may also include database 208 for storing data associated with client machines, network structure, and data to be transferred to the client machines from file server 202. In another embodiment, file server 202 may be in communication with other server(s) and client machine(s) (not shown) that are arranged to provide the data to be transferred from file server 202 to client machines 210-220.

Network 204 may be a network arranged to quickly and reliably transfer large amounts of file data to a high number of machines simultaneously. A number of client machines 210-220 to be involved in the transfer, the time when the client machines will request the transfer, and the amount of data requested may not be known up front.

An example for such a network may be a software test lab, where a high number of test machines need to receive software to be tested from the main file server. The client machines may be configured to test developer code changes before those changes are released to customers. Developers may submit a modified code to file server 202 directly or through another computing device. The modified code may be stored at file server 202, database 208, and the like. The modified code may then be distributed to all or an appropriate subset of the client machines for testing the changes.

In a centralized distribution structure, such as network 204, transfer performance may drop after the number of client machines initiating a request passes a threshold. The decline of performance may be more rapid as more client machines request transfer of files. At some point, the requests may actually begin to timeout and fail due to the number of client machines communicating directly with server 202. File server 202 may become constrained by parameters such as disk, CPU, network bandwidth, and the like. Physical limitations of the centralized distribution structure may result in poor performance and error conditions.

Figure 3:
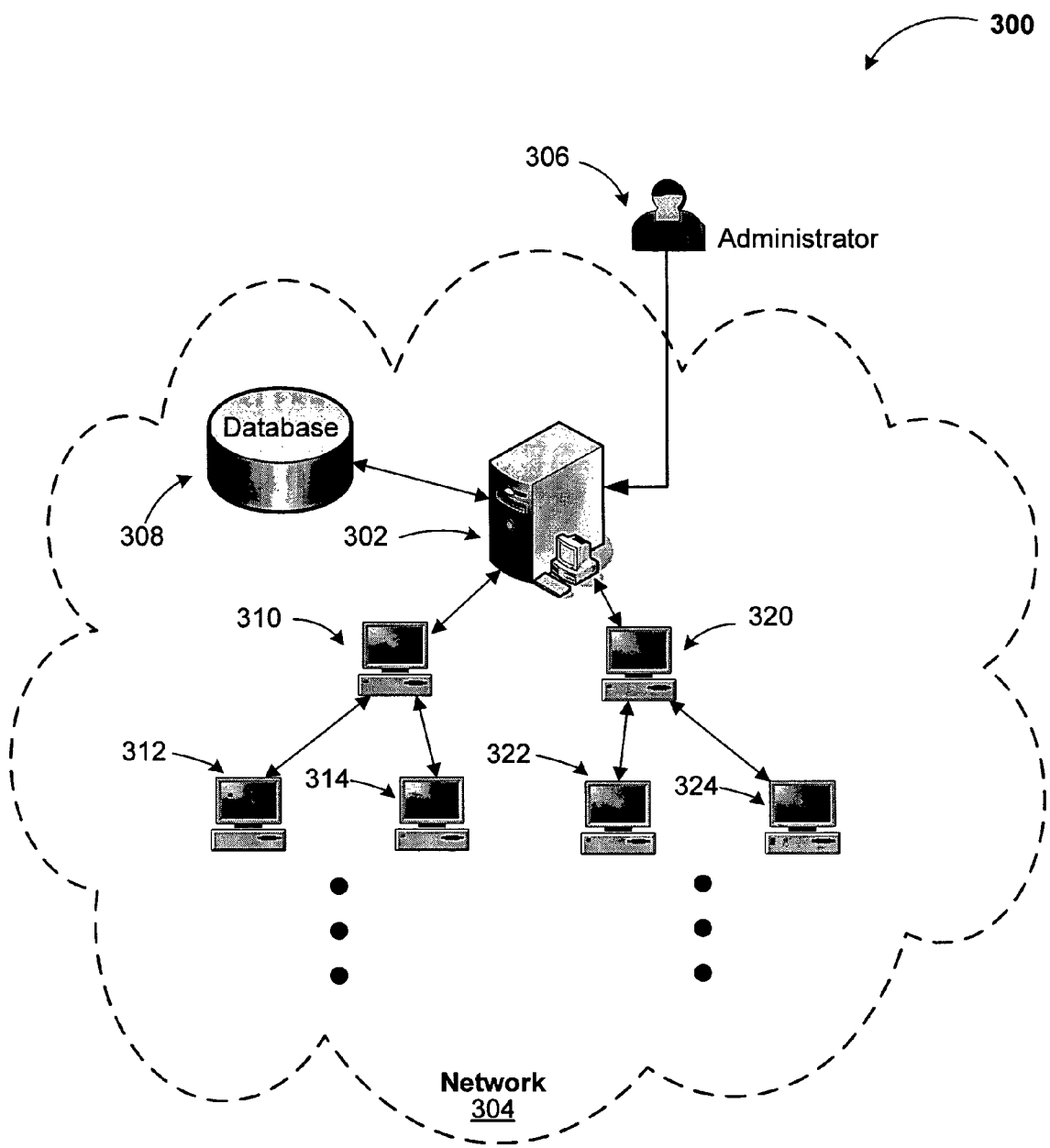
FIG. 3 illustrates an example file transfer system comprising a file server and client machines in a binary tree structure according to one embodiment.

FIG. 3 illustrates example file transfer system 300 comprising a file server and client machines in a binary tree structure according to one embodiment. File transfer system 300 includes network 304, in which file server 302 and a number of client machines participate. File server 302 may be managed by administrator 306. In one embodiment, network 304 may also include database 308 for storing data associated with client machines, network structure, and data to be transferred to the client machines from file server 302. In another embodiment, file server 302 may be in communication with other server(s) and client machine(s) (not shown) that are arranged to provide the data to be transferred from file server 302 to the client machines.

Client machines in network 304 are arranged in a binary tree structure. Client machines 310 and 320 are arranged to receive files to be transferred directly from file server 302. Client machines 312 and 314 are arranged to receive the files to be transferred from client machine 310. Similarly, client machines 322 and 324 are arranged to receive the files to be transferred from client machine 320. The binary structure of the client machines may continue up to a preset number of machines with each level of client machines communicating with the previous level in a binary tree structure. The preset number may be determined by the physical constraints of the network connections, client machine capabilities, and the like.

Managing the Copying of Files

In one embodiment, copying of files to multiple client machines is managed by having the client machines register with database 308 before starting to copy the files. Database 308 is arranged to group the client machines by the location they are trying to copy from and dynamically construct a file copy tree structure such that only two client machines are instructed to copy from file server 302 while two more are instructed to copy from each of these machines and so on. Each new client machine that registers with database 308 may be placed in an appropriate place in the binary tree. The file copies between machines may all occur simultaneously (not with one level in the tree needing to complete before the next can start) such that the files "trickle" down the tree. Hence, the leaf nodes in the tree experience only a relatively small latency in receiving each file.

In another embodiment, a wrapper script may be generated to facilitate this copying structure. The wrapper script may take as arguments a source location to copy from and a target location to copy to. The source location may be some directory shared on file server 302 and the target location may be a directory on client machines requesting the files. When invoked, the copy script may perform following actions:

create the target directory and assign it a name
    connect to the coordinating database (e.g. database 308)
        register the client machine's name and the source location it wants to copy from with the database
        receive a unique identifier from the database representing the attempted file copy
        receive a location from the database where to copy from (may not necessarily be the file server itself)
    copy all files from this location to the target directory
    change copy source location, if needed (at any point during the copying process based on network load, device availability, etc.)
    record file copy completion with the database
    poll the database to determine when all child nodes have completed copying from this machine and have disconnected
    exit The coordinating database (e.g. database 308) may have stored procedures to manage the interactions between the client machines and the files to be transferred. The stored procedures may ensure common methods of accessing the data, may create transactions around operations appropriately such that data integrity is ensured, and may perform calculations to generate and re-balance the hierarchical copying structure as new machines arrive or complete their copying.

Copying Files Faster

One concern with distributing the file copying into a binary tree structure is that a sizable propagation delay may be created, which may greatly increase an amount of time required to distribute the files to all machines needing it. By way of an example, if a network of fourteen client machines needs to copy a set of files, the structure includes a central file server at the root of the binary tree with three levels of client machines under that. The second level of machines may take a time period, T, to copy from the central file server. Then, each client machine connected to those in the next level may take the time period, T, to copy from the second level machines (after waiting T for the first level to complete). The fourth level may again take time period T to copy from the third level and wait 2T to begin copying. Accordingly, the earliest completion may be after T and latest after 3T resulting in an average time per machine of 2T. This may get worse as the binary tree grows deeper.

According to one embodiment of the present invention, each client machine begins copying from its parent immediately and is able to pick up each new file as it arrives at the parent. When the parent has completed copying all files, it marks itself as being complete in the database. Then it is only necessary for the client machines copying from the parent machine to attempt one final copy to pick up the remainder of the files. In this manner, the propagation delays are limited generally to the time to propagate a single file through all the levels of the tree structure, significantly reducing time to copy at all levels of the binary tree.

Figure 7:
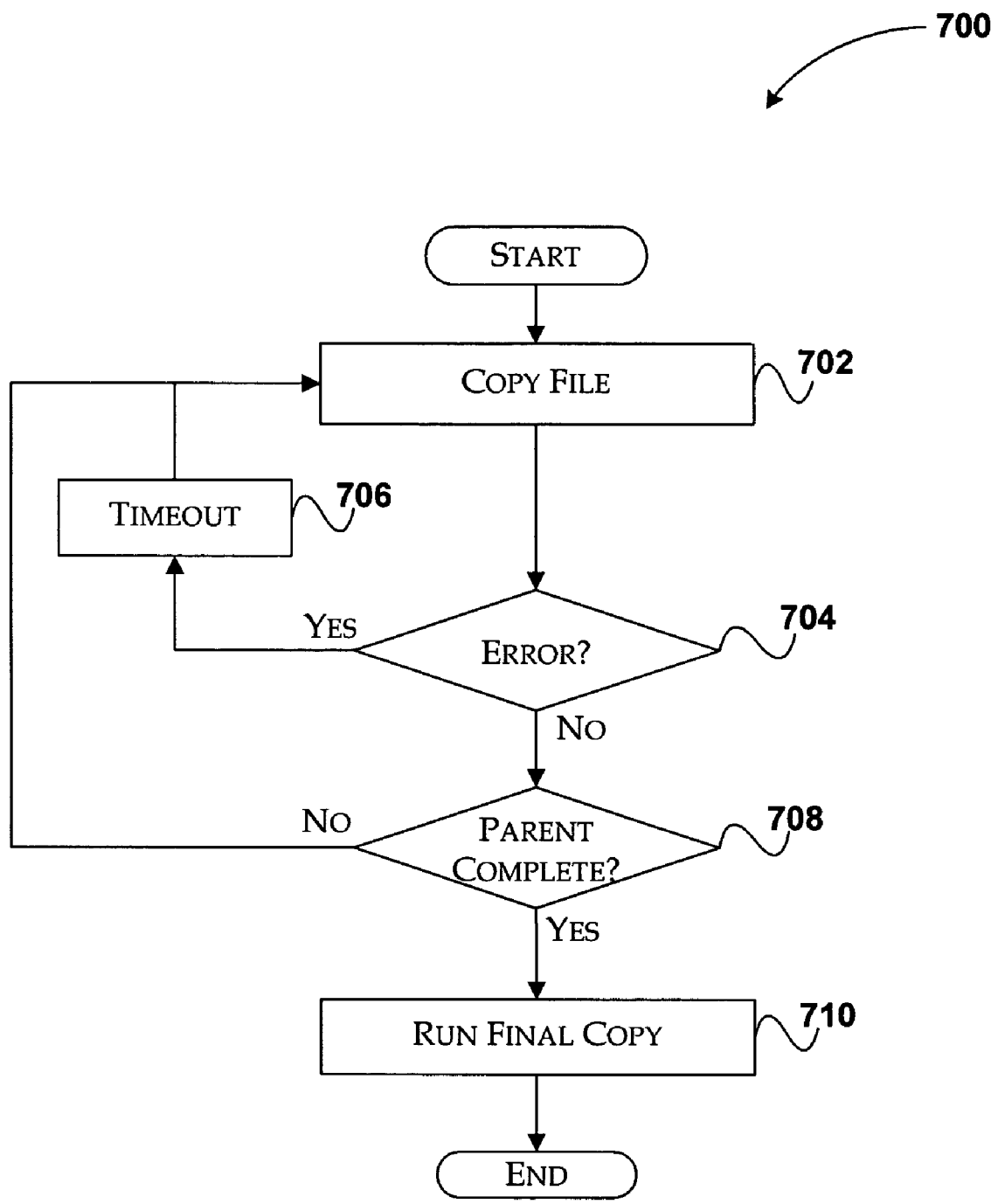
FIG. 7 is a logic flow diagram illustrating an example process for recursively copying files.

The copying mechanism utilizes an incremental, recursive file copy utility, which copies completed files from the parent machine due to the way the files are locked during the copy process (See FIG. 7 for an example recursive file copying process). Upon encountering a locked file, the utility errors out and exits. The copy utility is then run again, repeatedly, until the child machine notices that its parent has marked itself complete in the database. At that time, a final invocation is necessary to transfer the remainder of the files.

While the above solution does successfully distribute the burden of copying files from a single central file server to the considerably greater CPU, disk, and network resources available from the set of client machines, it may not reduce an amount of data necessary to transmit over the network. With the bottleneck of the central file server removed, the next bottleneck may become the network itself as there are many more client machines transferring more data (simultaneously) than before. Accordingly, the network may easily become saturated and the whole file copy process slow down in an expected manner but still remain reliable (in contrast to the conditions, which occur with a single overloaded file server).

Optimizing Network Usage

According to one embodiment, the copying tree may be constructed with knowledge of which client machines are on the same network switches such that file copying traffic can be directed as much as possible to occur within the same switch. This may reduce a load on the larger network around it and also utilize a relatively large bandwidth available between machines on the same switch.

Figure 4:
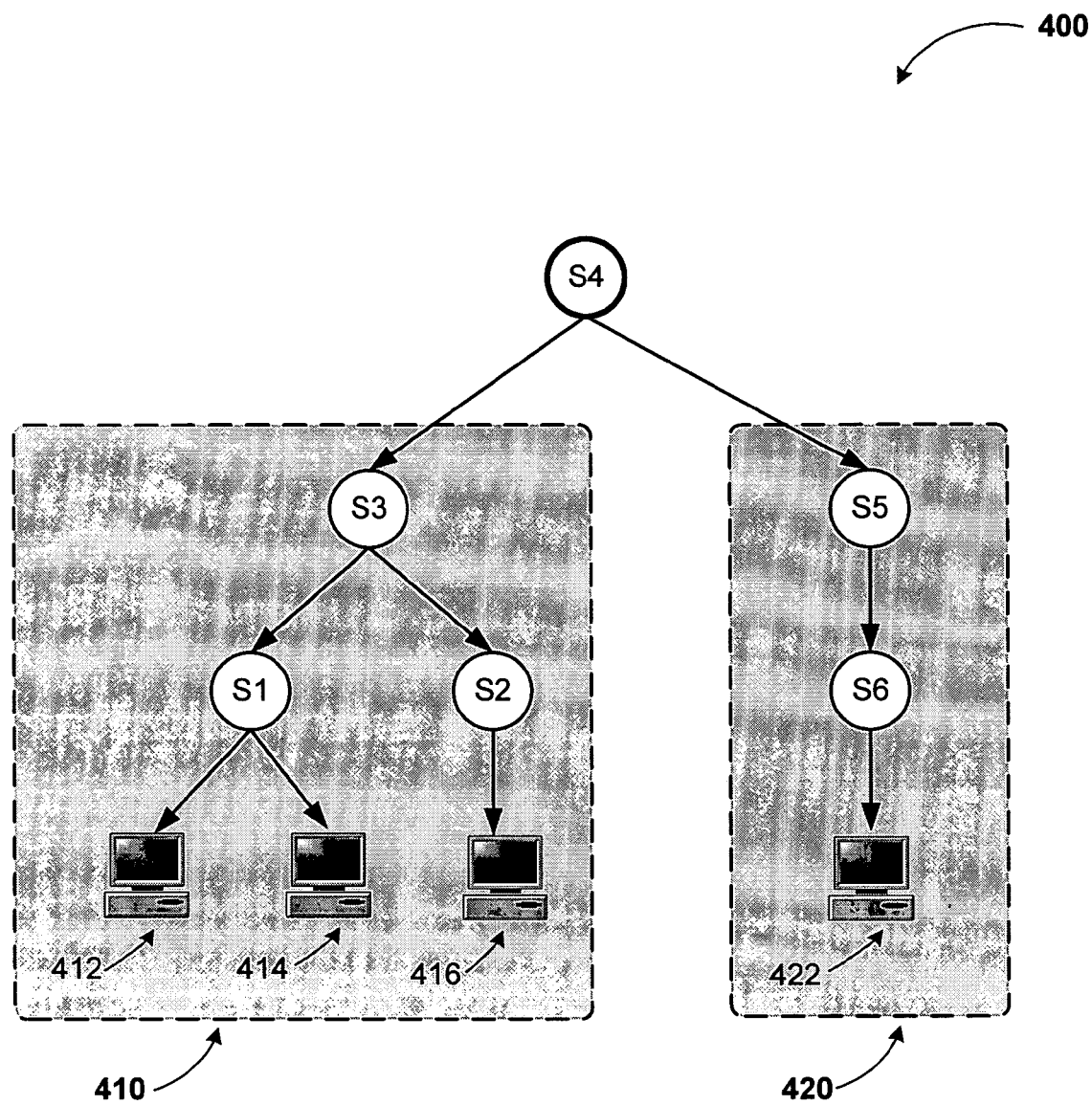
FIG. 4 is a diagram illustrating an example structure of client machines through a hierarchy of network switches in a file transfer system.

FIG. 4 is a diagram illustrating an example structure of client machines through a hierarchy of network switches in file transfer system 400. File transfer system 400 includes subnet 410 with client machines 412 and 414 connected to switch S1, and client machine 416 connected to switch S2. Switches S1 and S2 are connected to switch S3. File transfer system 400 further includes subnet 420 with client machine 422 connected to switch S6, which is in turn connected to switch S5. Switches S3 and S5 are top level switches of subnets 410 and 420, respectively, and connect to main network switch S4. Subnets 410 and 420 may be any subset of a file copying system, for example two labs in a software testing facility.

Generally, there is a relatively large amount of bandwidth available on a network infrastructure (more than when only considering major connection points into a larger network surrounding). In a typical system, the major connection points and the backbone lab network may have upwards of 1 Gb/s available bandwidth. However, this is relatively small compared to the individual switches that manage groups of client machines within the network. For example, a switch may have 80 ports. Each port on the switch is able to communicate with any other port on the switch at 1 Gb/s simultaneously. Accordingly, if forty machines communicate with another forty machines on the network switch, they could transmit 40*1 Gb/s, or 40 Gb/s. This communication may be performed without a significant impact on the much more limited network backbone.

Therefore, it is highly desirable for client machines on the same switch to copy files from each other and to limit requests to machines outside that switch. If it is not possible to copy from another machine on the same switch, then the next desirable operation is to copy from a machine on the same subnet. Generally, switches managing subnets are dedicated and have fewer machines competing for bandwidth than larger network backbones such as corporate uplinks. Consequently, it may be desirable for a client machine to copy from a closest client machine, where closeness may be defined by a number of switches that are traversed to connect the client machines.

In the example system of FIG. 4, the most desirable copy source location for client machine 412 is client machine 414. If client machine 414 is not available, the next desirable source location is client machine 416, because the connection is still within the same subnet (subnet 410). On the other hand, if client machine 412 is to copy files from client machine 422, the connection includes five subnet switches and one main network backbone switch. This may make the copying process highly inefficient in terms of network resources.

According to another embodiment of the present invention, the system may use a cost figure when building up the tree structure. When forming the tree structure the system may evaluate cost of links between client machines to be involved in the copying process. The tree structure for the copy process (this may be different than a physical structure of the network) may then be stored in the database along with lowest cost information linking those machines with lowest cost together. This computation is based having the necessary cost information pre-calculated and stored in the database.

In a further embodiment, only the network switches connecting the client machines may be considered instead of computing the costs of every client machine talking to every other possible client machine. Costs of various network switches may be assigned based on how dedicated they are. The tree may then be formed based on the lowest cost paths between the machines by adding costs of switches for the link.

FIG. 5 illustrates example table 500 of assigned shortest path costs for network switches of file transfer system 400 of FIG. 4.

As mentioned above, the tree structure for copying files may be formed based on link costs between the client machines and the link costs determined based on costs of various network switches forming the links. Such link costs, also called shortest path costs may be stored in a database in form of a table such as table 500.

In the example network of FIG. 4, there are six switches. Based on how dedicated they are, the switches directly connected to the client machines may be assigned a cost of "1", the lab backbone switches may be assigned a cost of "5", and all other switches may be assigned a cost of "10". To determine the cost of a link between one client machine and another client machine, the costs of all switches in that link involved are added together. Switches 1, 2, and 6 are of cost "1" as they are very dedicated to the client machines. Switches 3 and 5 are of cost "5" as they are less dedicated and serve a larger pool of client machines. Switch 4 is assigned a cost of "10" because it is on the main network and connects the two subnets. Table 500 reflects costs of links between different switches, in order to quickly compute and compare the cost of any machine communicating with any other machine.

Table 500 includes rows 501 and columns 502 showing the switches in the network. For example, if a link from client machine 412 to client machine 422 is sought, the cost for this link is (S1 through S6) "22". Therefore, an application forming the copying tree may be less likely to assign those two machines to the same tree structure. Table 500 may be stored in a database such as database 308 of FIG. 3.

In another embodiment, the information about client machines connections with switches may be updated periodically based on a corporate inventory database and subsequent copy-tree structures constructed accordingly.

Figure 6:
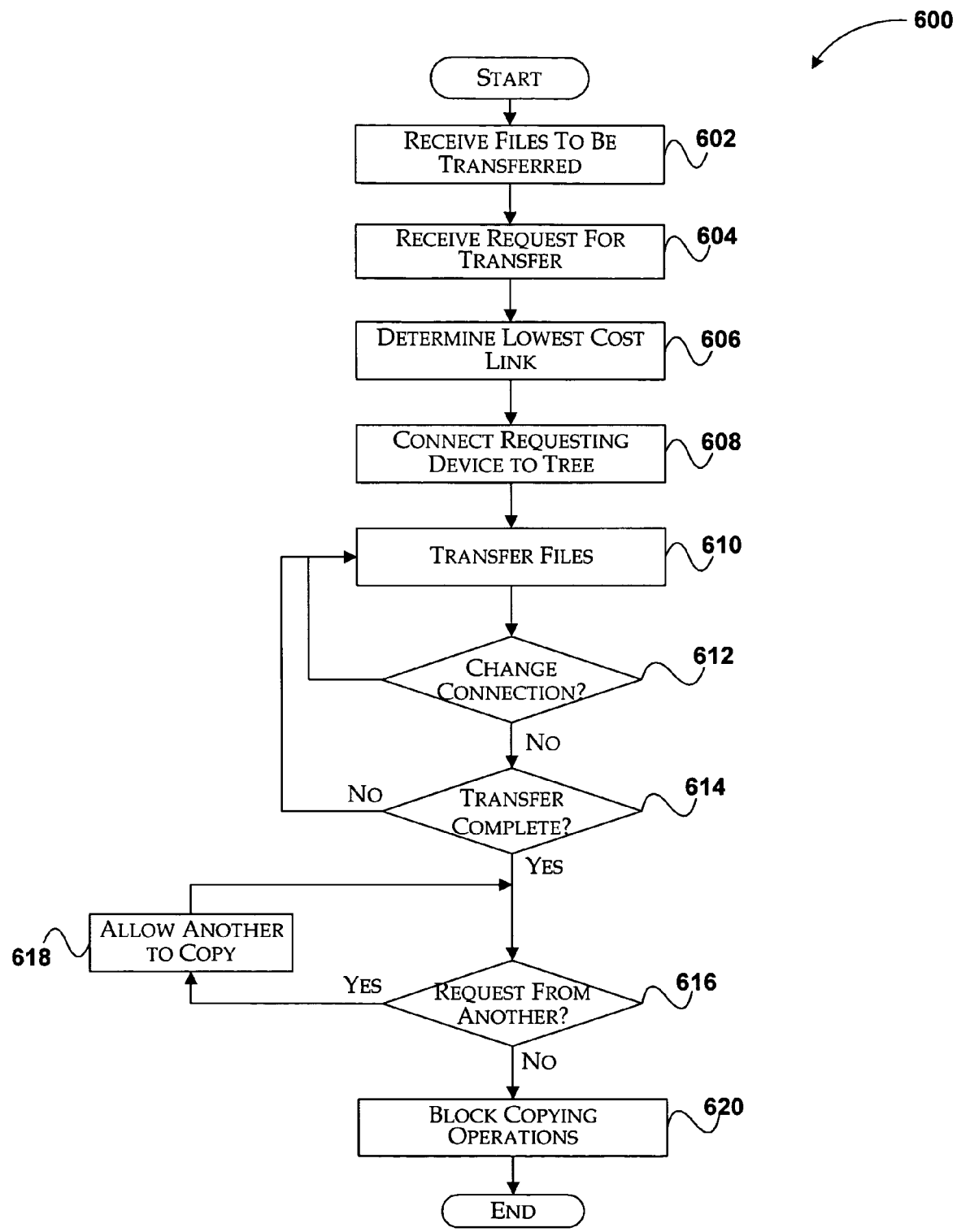
FIG. 6 is a logic flow diagram illustrating a process for optimizing distributed file transfer.

FIG. 6 is a logic flow diagram illustrating process 600 for optimizing distributed file transfer. Process 600 may be performed by a combination of file server 302 and client devices (e.g. client device 312) of FIG. 3. Process 600 begins at block 602, where files to be transferred to requesting client devices are received by the file server. By way of an example, such files may be a modified version of the image for a software application, and the like. A developer may provide the image for downloading to the test computers in a software test lab. Accordingly, the files may be provided via a network connection, via a removable storage medium, and the like. Processing moves from block 602 to block 604.

At block 604, the files server receives a request for transfer from a client device. In one embodiment, the files maybe transferred to all client devices connected to the file server (directly or indirectly). In another embodiment, the files may be transferred to a subset of client devices. While all client devices may request the transfer simultaneously, the invention is not so limited. Each client device may request the transfer at an arbitrary time. Processing proceeds to block 606.

At block 606, a lowest cost link is determined. In one embodiment, network resource efficiency may be considered in addition to device specific resources such as file server capacity, client device capacity, and the like. To utilize a relatively large network bandwidth available for local connections of switches, file transfer links may be limited to machines local to a switch. Because local connections may not always be available, switches within the network(s) including the client machines may be assigned costs for the purpose of prioritizing file transfer links. The costs may be assigned based on how dedicated the switches are.

Once the costs are assigned, lowest cost paths may be determined for transferring and receiving machine pairs (file server—client device or client device—client device). Stored procedures on the database may be used in conjunction with a look-up table including cost assignment information to decide where a transfer requesting client device is to be connected. Processing advances from block 606 to block 608.

At block 608, the transfer requesting client device is connected to a proper position within the tree structure for copying the files. The proper position may be selected based on the lowest cost information determined at block 606, available machines, and the like. Processing then moves to block 610.

At block 610, the requesting client device begins receiving the files. The file transfer is not necessarily performed in one step. In one embodiment, the requesting client device may ping the file source location periodically and receive the files that are currently stored until all the files are transferred. The "trickle"-style transferring of the files enables the system to reduce transfer times, because each level of client devices do not have to wait until the previous level has completed receiving all files. Processing proceeds to decision block 612 next.

At decision block 612, a determination is made whether the transfer of files is to be continued from a different machine acting as parent node. Re-balancing of the copy tree may be taken into account due to other machines completing, other machines entering into the tree, or the need to remove the parent for other reasons (for example, limits may be set for how long a parent node can be held in the tree once it has finished copying its files such that it is allowed to complete other processes). If the connection is to be changed, processing returns to block 610 for continued transfer of the remaining files from another parent node. If the connection is to be maintained, processing moves to decision block 614.

At decision block 614, a determination is made whether the transfer of all files is complete. If the transfer is not complete yet, processing returns to block 610. If all files have been transferred to the requesting client device, processing moves to decision block 616.

At decision block 616, a determination is made whether any other client devices are copying or requesting to copy files from the receiving client device. If there are other devices copying or requesting to copy files from the receiving client device, processing moves to block 618 to allow transfer of files to other requesting client machines. If the decision is negative, processing advances to block 620.

At block 620, copying operations of the receiving client device are completed and no other machines are requesting to copy files from the receiving client device. Therefore, copying operations are blocked for that particular machine and it can work on other processes such as performing tests on the received files, and the like.

The blocks included in process 600 are for illustration purposes. An optimized distributed file transfer system may be implemented by a similar process with fewer or additional steps including customization of transfer tree structure and determination of lowest cost links.

FIG. 7 is a logic flow diagram illustrating example process 700 for recursively copying files. Process 700 may be performed in a file server implementing one embodiment of the present invention such as file server 202 of FIG. 2.

Process 700 begins at block 702 where a file is copied. As described above, the file may be copied from a file server to a client machine, from a client machine acting as a parent node to a client machine acting as a child node, and the like. Processing moves to decision block 704 next.

At decision block 704, a determination is made whether an error has occurred during copying. If an error has occurred, processing proceeds to block 706, else processing moves to decision block 708.

At block 706, a timeout is issued and processing returns to block 702 for another attempt at copying the file. At decision block 708, a determination is made whether the machine acting as parent node (file server or client machine) has completed storing all files in the image that is being copied. If the parent machine has completed, processing advances to block 710. Otherwise, processing returns to block 702.

At block 710, a final copy is run copying the last remaining files of the image. Processing then moves to a calling process for further actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for optimized distribution of files from a file source location computer, comprising:
   assign a cost parameter to each network switch associated with each client device based on at least one characteristic of the network switch, wherein the cost parameter is assigned based on how the network switch is configured; and
   connecting a first computing device to the file source location computer for copying the files from the file source location computer;
   connecting a second computing device to the first computing device for copying the files from the first computing device, wherein the connection between the file source location computer, the first computing device, and the second computing device is organized according to a tree structure such that a number of connections to the file source location computer is limited at most three computers, wherein limiting the number of connections to at most three computers comprises:
   limiting the connects, for receiving the file at the first computing device, to a first connection between the file source and the first computing device, and
   limiting the connects, for transferring the file from the first computing device, to a second connection to the second computing device and a third connection to a third computing device; and
   copying the files from the file source location computer to the first computing device and from the first computing device to the second computing device in a recursive manner such that if a locked file is encountered, an error is issued and the locked file attempted to be copied again until the computing device to receive the files notices that the computing device copying the files has marked itself complete in a database for storing information associated with the tree structure, wherein copying the files from the file source location computer to the first computing device and from the first computing device and to the second computing device comprises simultaneously copying the files from the file source location computer to the first computing device and from first computing device and to the second computing device, wherein the files are copied by trickling down the tree structure.

2. The method of claim 1, further comprising: connecting additional computing devices to the first computing device and the second computing device for copying the files from the first computing device and the second computing device such that a number of connections to all computing devices is limited.

3. The method of claim 2, wherein the first computing device, the second computing device, and the additional computing devices are arranged in a binary tree structure comprising parent and child nodes such that each computing device acting as a parent node is connected to one of a single child node and two child nodes.

4. The method of claim 3, wherein each computer device acting as a child node is arranged to receive the files from a corresponding computing device acting as a parent node in the recursive manner as the files are stored in the computing device acting as the parent node.

5. The method of claim 3, further comprising: storing the information associated with a structure of the binary tree in the database such that each computing device joining the binary tree to receive the files is connected to an available computing device acting as a parent node.

6. The method of claim 5, wherein a structure of the binary tree is determined based on a cost analysis of network connections between a computing device attempting to join the binary tree and computing devices already in the binary structure.

7. The method of claim 3, further comprising:
reporting a completion of file copying for each computing device acting as a child node when all files are copied to the computing device; and
blocking subsequent copying operations on each computing device acting as the child node until other computing devices acting as child nodes have completed their copying operations.

8. A computer-readable storage medium having computer-readable instructions stored thereon for optimized distribution of files from a file source location computer to computing devices in a network, the instructions comprising:
determining a number of switches associated with the computing devices to receive the files;
assigning a cost parameter to each switch based on at least one characteristic of each switch including a dedication level of each switch;
connecting the computing devices to receive the files such that the computing devices are arranged in a tree structure with the file source location acting as a root node, wherein a position of each computing device in the tree is determined based on a computation of the cost parameters associated with the computing device, wherein connecting the computing devices to receive the files in the tree structure comprises:
limiting the connects, for receiving the file at the first computing device, to a first connection between the file source and the first computing device, and
limiting the connects, for transferring the file from the first computing device, to a second connection to the second computing device and a third connection to a third computing device;
copying the files from the file source location computer to the computing devices through the tree structure in a recursive manner such that if a locked file is encountered in a computing device acting as a parent node, an error is issued and the locked file attempted to be copied again until another computing device acting as a child node to the computing device acting as the parent node notices that the computing device acting as the parent node has marked itself complete in a database for storing information associated with the tree structure, wherein copying the files from the file source location computer to the computing devices comprises simultaneously copying the files from the file source location computer to the computing devices, wherein the files are copied by trickling down the tree structure; and
blocking subsequent copying operations on each computing device acting as the child node until other computing devices acting as child nodes have completed their copying operations.

9. The computer-readable storage medium of claim 8, wherein the computation of the cost parameters associated with the computing device includes adding the cost parameters of each switch between the computing device and the file source location computer.

10. The computer-readable storage medium of claim 8, wherein the instructions further include: receiving the files at the file source location computer from at least one of: another computing device through the network, user input, and a file storage database.

11. The computer-readable storage medium of claim 8, wherein the instructions further include:
storing in a database at least one of: information associated with the structure of the tree, the files to be distributed, and information associated with the computation of cost parameters related to connections between each computing device in the tree structure;
registering each new computing device to receive the files with the database; and
reporting to the database completion of transfer of the files to each computing device.

12. The computer-readable storage medium of claim 8, wherein connecting the computing devices to receive the files in the tree structure includes selecting a lowest cost parameter sum between a computing device acting as a child node and another computing device acting as a parent node in the tree structure.

13. The computer-readable storage medium of claim 12, wherein the instructions further include: storing the lowest cost parameter sum for connections between each computing device pair in the tree structure as a cost matrix in a database.

14. The computer-readable storage medium of claim 8, wherein the tree structure is a binary tree structure such that a computing device acting as a parent node is arranged to connect to one of: a single computing device acting as a child node and two computing devices acting as the child nodes.

15. A system for optimized distribution of files, comprising:
a file server that is arranged to:
receive the files from at least one of: another computing device through the network, user input, and a file storage database;
transfer the files to requesting client devices, wherein the client devices are arranged to act as parent and child nodes in a binary tree structure for copying the files from the file server to the client devices through the tree structure in a recursive manner such that if a locked file is encountered in a client device acting as a parent node, an error is issued and the locked file attempted to be copied again until another client device acting as a child node to the client device acting as the parent node notices that the client device acting as the parent node has marked itself complete in a database for storing information associated with the tree structure, wherein copying the files from the file server to the client devices comprises the file server being connected to at most three client devices, wherein copying the files comprises simultaneously copying the files from the file server to the client devices, wherein the files are copied by trickling down the tree structure;

assign a cost parameter to each network switch associated with each client device based on at least one characteristic of the network switch, wherein the cost parameter is assigned based on how the network switch is; and form the binary tree structure such that a position of each client device in the binary tree structure is determined based on a computation of the cost parameters associated with a link between a transferring and a receiving client device, wherein client devices connected to the same switch have a lower cost than client devices not connected to the same switch;

at least one client device, but no more than two client devices that are arranged to:
register to request a transfer of the files;
receive a unique identifier and a location to receive the files from; and
report a completion of the transfer of the files upon receiving all of the files.

16. The system of claim 15, wherein the tree structure is arranged such that subsequent copying operations on each client device acting as the child node are blocked until other client devices acting as child nodes have completed their copying operations.

17. The computing device of claim 15, wherein the position of each client device is determined by forming a link with a lowest sum of cost parameters between the transferring and the receiving client devices.

18. The computing device of claim 15, wherein the at least one client device is further arranged to disconnect from a file source location upon receiving all of the files.

* * * * *